Patented Aug. 12, 1952

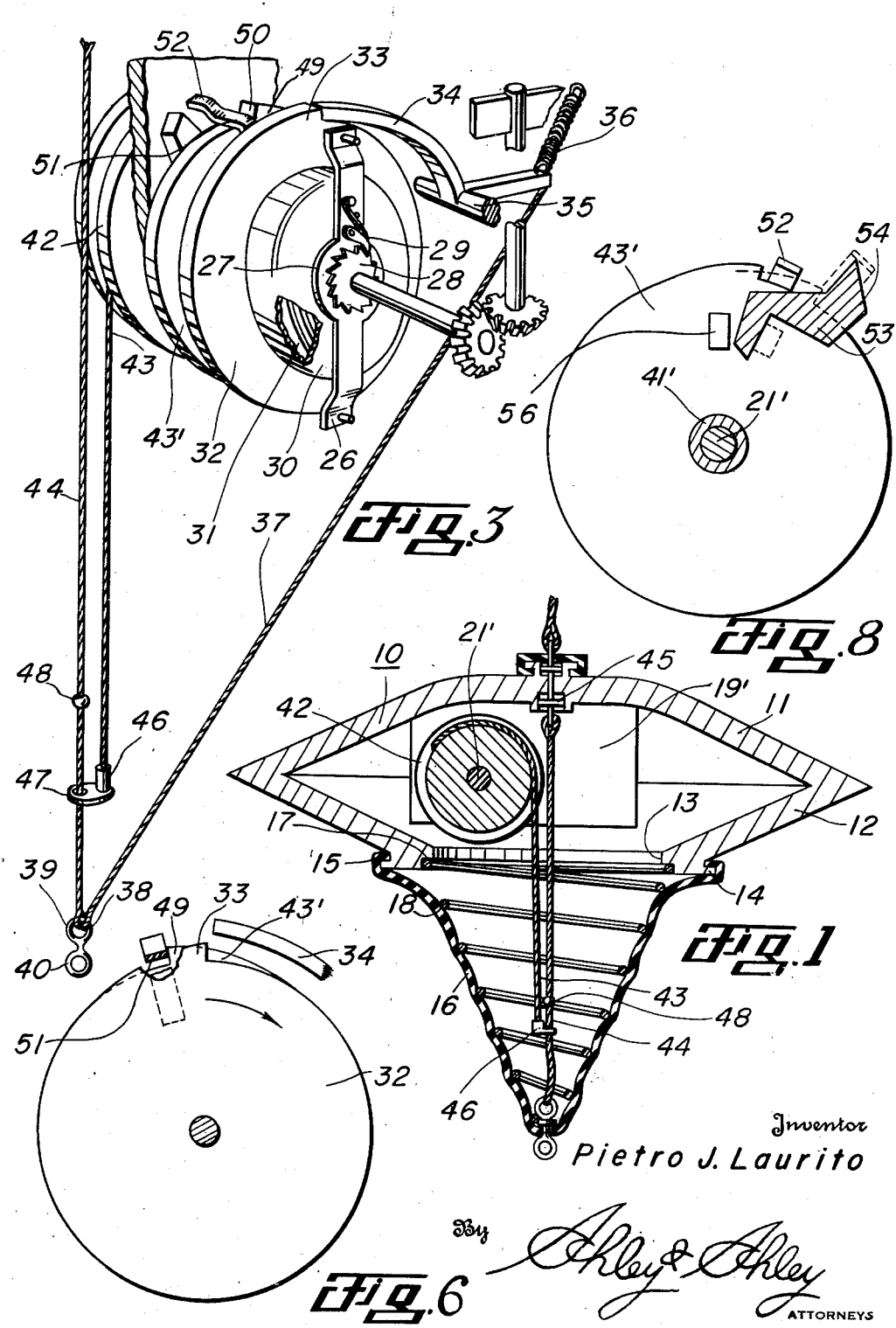

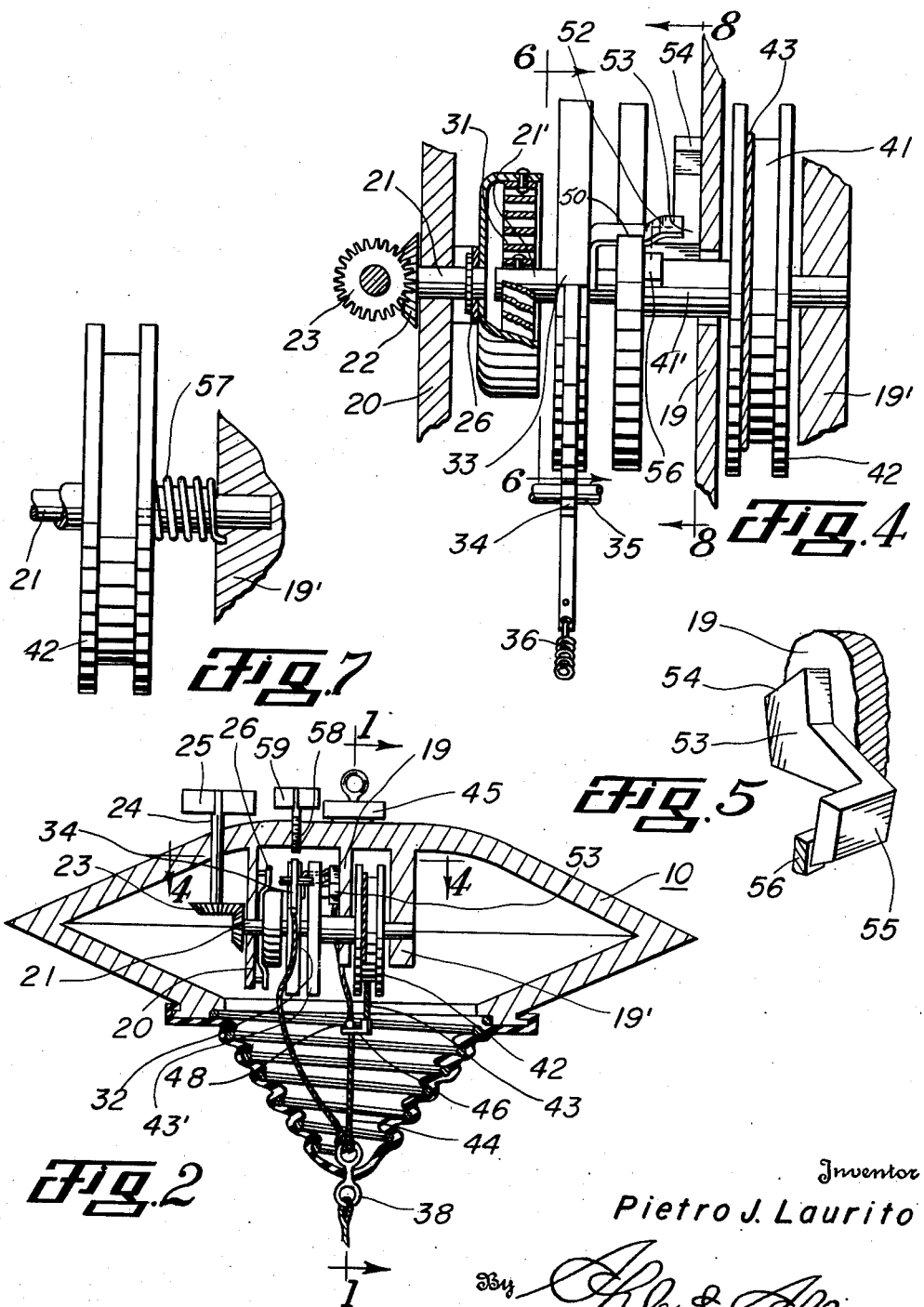

2,606,385

UNITED STATES PATENT OFFICE 2,606,385

AUTOMATIC FISHING FLOAT

Pietro J. Laurito, Austin, Tex.

Application July 28, 1950, Serial No. 176,368

9 Claims. (Cl. 43—15)

This invention relates to new and useful improvements in automatic fishing floats.

A particular object of the invention is to provide an improved automatic fishing float which will automatically apply an upward thrust to a fishing line in response to a downward movement of said line.

Another object of the invention is to provide an improved automatic fishing float which is very quick and positive in its action, and which responds to the nibble or bite of a fish upon the fishing line with much greater rapidity than can be achieved by the average fisherman.

Yet another object of the invention is to provide an improved fishing float having a spring motor which may be wound and which will enable the float to function a number of times in response to successive nibbles or bites by a fish, without necessitating rewinding of the mechanism or other manipulation of the float between successive nibbles or bites.

An important object of the invention is to provide an improved automatic fishing float which will function to give an upward jerk or thrust upon the fishing line in response to the nibble or bite by a fish upon said line, and which will automatically return itself to an operative position or condition following said action whereby the float is automatically restored to an operative condition following a single actuation, and will continue to reset itself and remain at all times in condition to function in response to nibbles or bites by a fish and without requiring any manipulation or resetting by the fisherman.

A further object of the invention is to provide an improved automatic fishing float having provision for rendering the mechanism inoperative whereby the float functions as a simple and ordinary type of float.

A construction designed to carry out the invention will be hereinafter described together with other features of the invention.

The invention will be more readily understood from a reading of the specification and by reference to the accompanying drawings, wherein examples of the invention are shown, and wherein:

Fig. 1 is a vertical sectional view of a float constructed in accordance with this invention and showing the float in condition ready to function, Fig. 2 is a vertical sectional view taken at right angles of Fig. 1, and showing the float immediately following actuation, Fig. 3 is an enlarged view in perspective showing the operating mechanism of the float, Fig. 4 is an enlarged, fragmentary, horizontal, cross-sectional view taken from above the float operating mechanism, on the line 4—4 of Fig. 2, Fig. 5 is an enlarged view in perspective showing the spring releasing cam, Fig. 6 is a vertical, cross-sectional view taken upon the line 6—6 of Fig. 4, Fig. 7 is a fragmentary, horizontal, cross-sectional view of the line drum shaft showing a modified structure, and Fig. 8 is a view similar to Fig. 6, taken on the line 8—8 of Fig. 4.

In the drawings, the numeral 10 designates a hollow float, generally circular in horizontal cross-section and having a domed or dished upper plate 11, and a downwardly dished lower plate 12. The float is hollow and is thus in the shape of a relatively fat or thick disk. A central opening 13 is provided in the bottom plate 12, and an annular flange 14 is formed on the bottom plate surrounding said opening and extending outwardly therefrom. The upper lip 15 of a conical, flexible diaphragm 16 engages the flange 14 and is held in position thereby. A recessed seat 17 is provided surrounding the opening 13 inwardly from the flange 14, and the upper end of a coiled spring 18 engages the seat 17. As shown in Fig. 1, the spring 18 has a generally conical configuration, embracing the inner surface of the conical diaphragm 16 and constantly urging the same downwardly into an extended position. While any suitable materials of construction may be employed for the invention, it has been found desirable to form the float 10 of plastic or some other suitable light material, and to form the diaphragm 16 of some of the elastic plastic sheets or of rubberized cloth. Of course, both elements should be impervious to moisture.

Within the hollow interior of the float 10, a pair of depending semi-partitions 19 and 20 are provided, said partitions being parallel and spaced from one another and being positioned approximately in the central portion of the float body. As shown in Fig. 2, the partitions terminate short of the lower portion of the float body, and provide supports for the operating mechanism of the float. A shaft 21 extends horizontally through the partition 20 and is rotatable therein, while a similar shaft 21' is axially alined with the shaft 21 and has one end journaled in a third partition 19' disposed parallel to the partition 20. The shaft 21' extends through the partition 19 and terminates adjacent the inner end of the shaft 21. A miter or beveled gear 22 is secured upon the outer end of the shaft 21 outwardly of the partition 20, and meshes with a similar gear 23 mounted upon the lower end of a vertical shaft 24 extending through the upper plate 11 and projecting above the upper surface of the float. A suitable winding handle 25 is carried upon the upper end of the shaft 24, and it is obvious that rotation of said handle will result in rotation of the shaft 21.

An elongate bracket 26 is secured upon the inner surface of the partition 20 and has its central portion 27 enlarged so that the shaft 21 passes freely therethrough. A ratchet wheel 28 is secured upon the shaft adjacent the bracket, and a ratchet pawl 29 is carried by said bracket so as to engage said ratchet wheel. As viewed in Fig. 3, the pawl holds the ratchet wheel and the shaft against counter-clockwise movement, but will permit clockwise movement thereof. The shaft 21 terminates immediately beyond the bracket 26 and has secured upon its inner end a cylindrical spring drum 30 within which a flat spiral motor spring 31 is disposed. The outer periphery of the spring 31 is secured to the drum 30, and the inner portion of the spring engages and is secured to the left-hand end of the shaft 21', as viewed in Fig. 4. Manifestly, rotation of the drum 30 by means of the shaft 21 will cause the spring 31 to be wound and to tend to urge the shaft 21' to revolve in a clockwise direction, as viewed from the position of Fig. 3. Adjacent the spring 31, an operating disk 32 is keyed or otherwise secured upon the shaft 21', said disk being substantially circular in shape and having a single peripheral shoulder 33 extending radially thereof. The shoulder is normally engaged by one end of a pawl lever 34 pivoted between the partitions 19 and 20 upon a suitable axle 35 and normally pressed into engagement with the periphery of the disk 32 by a coiled spring 36 connected between the pawl lever and the upper plate 11 of the float body. The pawl lever is adapted to be swung upon actuation of the device to raise the same from engagement with the operating disk and to permit the disk to be revolved through one turn by means of the motor spring 31.

For tripping the pawl lever 34, a suitable cord or other suitable member 37 extends between the same and a double-eyed fitting 38 secured in the lowermost extremity of the diaphragm 16. The lower end of the cord 37 is connected to the upper eye 39 of the fitting 38, and normally the ordinary fishing line or rig (not shown) would be connected to the lower eye 40 of said fitting. When a fish tugs upon the fishing line connected to this float, downward movement of the fitting 38 will result, and such movement, by moving the cord 37 downwardly, will swing the pawl lever 34 upwardly and release the operating disk 32. Thereupon, the disk turns through one revolution under the impetus of the motor spring 31, but since the tug of a fish is normally only momentary, the tension in the cord 37 will have been relieved or released by the time the disk has completed one revolution, and hence the spring 36 will have again moved the pawl lever into engagement with the periphery of said disk. Thus, the pawl lever will engage the shoulder 33 after one revolution of the disk, and will prevent further movement of the latter.

A line drum or reel 41 is formed integrally with a sleeve 41' rotatably mounted upon the shaft 21' so as to be free to turn thereon, said sleeve extending through and being rotatably mounted in the partition 19. The reel 41' is disposed between the partitions 19 and 19', has marginal flanges 42, and carries an actuating cord 43. The cord 43 has its upper extremity suitably secured to the reel, and passes therearound in a counter-clockwise direction, as viewed in Fig. 3, so as to depend downwardly into the diaphragm 16. A third cord 44 extends between the upper eye 39 of the fitting 38 and a fitting 45 provided in the central upper portion of the top plate 11. A foot 46 is secured upon the lower end of the cord 43 and has an opening 47 through which the cord 44 passes. A suitable stop fitting 48 is clamped or otherwise affixed upon the cord 44 above the foot 46, and it is obvious that upward movement of the cord 43 will cause the foot to engage the stop 48 and pull the lower portion of the cord 44 upwardly.

For revolving the drum 41 to cause upward movement of the cord 43, a driven disk 43' is formed integrally on the sleeve 41' between the partition 19 and the disk 32, and a cam tooth 49 extends radially from the periphery thereof. As shown in Fig. 3, the tooth 49 has a flat, radially extending shoulder 50 facing in a direction opposite to the shoulder 33 and normally situated approximately in transverse alinement with the latter shoulder. A flat leaf spring 51 is secured upon the operating disk 32 and projects horizontally across the upper portion of the disk 43', the spring clearing the periphery of the disk but being in a position to engage the shoulder 50 upon revolution of the operating disk 32. The outer end 52 of the spring is offset away from the disk 43' for purposes to be described hereinafter.

With this arrangement, as the operating disk 32 turns through one revolution, the spring 51 is moved therewith, and because of its engagement with the shoulder 50, causes the disk 43' and drum 41 also to move through one revolution. Obviously, this action winds the cord 43 onto the drum causing the foot 46 to move upwardly into engagement with the stop 48 and imparting a sudden upward movement to the line 44. This movement is transmitted through the fitting 38 to the fishing line.

It is desirable to release the reel 41 and the disk 43' after one revolution, and this is done by lifting the spring 51 from engagement with the shoulder 50. A cam or wedge block 53 is secured upon the inner surface of the partition 19 at the upper end thereof, and is so positioned as to engage the outer offset end 52 of the spring 51 as the latter nears the upper portion of its circular path. The upper surface 54 of the wedge element 53 is inclined upwardly, and as the spring 51 rides thereover, it is flexed and lifted so as to be moved above or radially outwardly from the shoulder 50. When this occurs, the drum 41 and the disk 43' are no longer being driven, and are free to return in the opposite direction to their original position. The returning action is accomplished by the coil spring 18, which is constantly urging the diaphragm 16 downwardly and hence is exerting a constant downward force upon the cord 44 and the cord 43. The coil spring 18 is compressed during the action of the drum 41 in moving the cords 43 and 44 upwardly, and therefore is available as a source of energy in returning the cords to their lower positions and for revolving the drum 41 and the disk 43' in a counter-clockwise direction, as viewed in Fig. 3.

It is possible that the driven element constituted by the disk 43' and the drum 41, through the rapidity of their revolution, might, through inertia, continue to turn in a clockwise direction so that the spring 51 might drop in behind the shoulder 50 after said spring had been released by the cam or wedge block 53. To eliminate this possibility, the wedge block carries an arm 55 projecting toward the side of the disk 43', and a complementary block or lug 56 is secured upon said disk. As the drum and disk near the completion of one revolution, the lug 56 may engage the arm 55 so that further revolution of the drum and disk may be prevented. This action would take place before the shoulder 50 had been moved far enough past the wedge block 53 to permit the spring 51 to drop in behind said shoulder. The action normally never takes place, however, since the drum and disk halt their revolution as soon as the spring 51 is lifted from the shoulder 50. Under unusual circumstances, if the drum was turning very rapidly, there might be some overtravel, and if this occurred, the lug 56 and arm 55 would function to limit the movement of the drum and prevent the possible re-engagement of the spring with the shoulder 50. Of course, as soon as the drum and the disk 43' have been released, they return to their original position through the action of the spring 18, and are again ready to impart a surge or impetus to the line 44 upon a subsequent actuation or release of the operating disk 32.

Meanwhile, the disk 32 has completed its revolution and has been stopped by engagement with the pawl lever 34 so that the entire device has returned to its original position and the elements have all returned to their operative positions ready to receive another impulse from the fishing line through the fitting 38 and the cord 37. The only change which occurs is that the spring 31 is partially released or unwound, but it is pointed out that the strength and capacity of the spring is such as to accommodate a considerable number of the operations described. Of course, the spring must be rewound periodically if a number of bites or nibbles are being encountered, but in between windings, the spring continues to function as a motor to drive the disk 32 and to revolve the reel 41 periodically to impart movement to the fishing line.

In the event a more rapid return of the reel 41 is desired, a coil spring 57 may be positioned upon the shaft 21' and connected between said reel and the partition 19'. Since this spring will be wound or distorted as the drum is being revolved clockwise, as viewed in Fig. 3, energy will be stored in said spring to urge the drum in a counter-clockwise direction upon release of the driving spring 51.

An additional provision may be made, if desired, and is illustrated in Fig. 2. A screw-threaded bolt 58 may be mounted in the top plate 11 of the float body, and provided with a handle 59 whereby the bolt may be screwed downwardly into engagement with the upper portion of the pawl lever 34. Obviously, when the bolt is thus screwed downwardly, it will hold the pawl lever against movement and will lock the tripping mechanism. In this condition, the float functions simply as a float and will not provide any upward movement of the fishing line in response to a downward tug thereon imparted by a fish.

The automatic fishing float set forth herein is rugged and is relatively simple in construction in view of the functions accomplished, and has been found to serve admirably for hooking fish of the type which bite very quickly and are difficult to catch. When the fish bites or nibbles upon the bait and pulls the fishing line downwardly, the float mechanism is immediately released and almost instantaneously jerks the fishing line upwardly in an effort to hook the fish which is biting. It is to be noted, however, that the upward movement, though rapid, is of small amplitude and does not tend to jerk the hook out of the fish, or jerk the bait entirely away from the fish.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An automatic fishing float including, a float body having an open bottom, an extensible diaphragm closing said open bottom, means for connecting a fishing line to the diaphragm, a spring motor in the float body, an operating member connected to the motor and driven thereby, a catch holding the operating member against movement, means connected between the diaphragm and the catch for releasing the latter upon downward movement of the diaphragm, a driven member in the float body, a connection member carried by the driven member and linked to the diaphragm, and a driving connection between the operating member and the driven member.

2. An automatic fishing float including, a float body having an open bottom, an extensible diaphragm closing said open bottom, means for connecting a fishing line to the diaphragm, a spring motor in the float body, an operating member connected to the motor and driven thereby, a catch holding the operating member against movement, means connected between the diaphragm and the catch for releasing the latter upon downward movement of the diaphragm, a driven member in the float body, a connecting member carried by the driven member and linked to the diaphragm, a driving element extending from the operating member, and a shoulder on the driven member engaged by the driving element.

3. An automatic fishing float as set forth in claim 2, and means for shifting the driving element out of engagement with the shoulder after a predetermined degree of movement of the operating member.

4. An automatic fishing float as set forth in claim 3, and a spring constantly urging the diaphragm downwardly with respect to the float body.

5. An automatic fishing float including, a float body having an open bottom, an extensible diaphragm closing said open bottom, means for connecting a fishing line to the diaphragm, a spring motor in the float body, an operating disk connected to the motor and revolved thereby, a catch holding the disk against revolution, means connected between the diaphragm and the catch for releasing the latter upon downward movement of the diaphragm, a driven element in the float body including a drum, a flexible connecting member secured to the drum and linked to the diaphragm, a deflectable driving element extending from the disk adjacent the driven element, a shoulder on the driven element engaged by the driving element, and a cam element in the path of movement of the driving element for deflecting the latter from engagement with the shoulder after a predetermined degree of revolution of the disk.

6. An automatic fishing float including, a float body having an open bottom, an extensible diaphragm closing said open bottom, means for connecting a fishing line to the diaphragm, a spring motor in the float body, an operating disk connected to the motor and revolved thereby, a catch holding the disk against revolution, means connected between the diaphragm and the catch for releasing the latter upon downward movement of the diaphragm, a driven element in the float body including a drum, a flexible connecting member secured to the drum and linked to the diaphragm, a deflectable driving element extending from the disk adjacent the driven element, a shoulder on the driven element engaged by the driving element, a cam element in the path of movement of the driving element for deflecting the latter from engagement with the shoulder after a predetermined degree of revolution of the disk, and stop elements on the driven element and the float body for limiting the degree of revolution of the drum.

7. An automatic fishing float including a float body having an open bottom, an extensible diaphragm closing said open bottom, means for connecting a fishing line to the diaphragm, a spring motor in the float body, an operating disk connected to the motor and revolved thereby, a catch holding the disk against revolution, means connected between the diaphragm and the catch for releasing the latter upon downward movement of the diaphragm, a driven element in the float body including a drum, a flexible connecting member secured to the drum and linked to the diaphragm, a deflectable driving element extending from the disk adjacent the driven element, a shoulder on the driven element engaged by the driving element, a cam element in the path of movement of the driving element for deflecting the latter from engagement with the shoulder after a predetermined degree of revolution of the disk, and a flexible connection between the diaphragm and the float body, the flexible connecting member being linked to the diaphragm through said flexible connection.

8. An automatic fishing float including, a float body, a spring motor in said body, a driving member adapted to be revolved by the motor, a driven member adapted to be revolved by said driving member, a releasable connection between the driving member and the driven member, means for releasing the connection after a predetermined degree of revolution of one of said members, means for attaching a fishing line to the float, and means for imparting movement to said line upon revolution of the driven member, the releasable connection being a spring member adapted to engage the driven member, and the releasing means being arranged to flex said spring member to disengage the latter from the driven member.

9. An automatic fishing float including, a float body, a spring motor in said body, a driving member adapted to be revolved by the motor, a driven member adapted to be revolved by said driving member, a releasable connection between the driving member and the driven member, means for releasing the connection after a predetermined degree of revolution of one of said members, means for attaching a fishing line to the float, means for imparting movement to said line upon revolution of the driven member, and spring means for returning the driven member to its original position after release of the releasable connection.

PIETRO J. LAURITO.

REFERENCES CITED

The following references are of record in the file of this patent:

UNITED STATES PATENTS

| Number | Name | Date |
|---|---|---|
| 371,777 | McCabe | Oct. 18, 1887 |
| 1,568,527 | Pearson | Jan. 5, 1926 |
| 2,545,385 | Reppert | Mar. 13, 1951 |